United States Patent
Theising et al.

(10) Patent No.: US 8,756,756 B2
(45) Date of Patent: Jun. 24, 2014

(54) VACUUM APPLIANCE WITH ADJUSTABLE TOOL SUPPORT SYSTEM AND METHOD OF USE

(75) Inventors: John L. Theising, St. Peters, MO (US); Douglas K. Ritterling, Chesterfield, MO (US); Shane Glasgow, Saint Ann, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 13/484,998

(22) Filed: May 31, 2012

(65) Prior Publication Data
US 2013/0081223 A1 Apr. 4, 2013

Related U.S. Application Data

(60) Provisional application No. 61/542,281, filed on Oct. 3, 2011.

(51) Int. Cl.
*A47L 9/00* (2006.01)
*A47L 11/40* (2006.01)

(52) U.S. Cl.
USPC .................................. 15/354; 15/401; 15/356

(58) Field of Classification Search
CPC .... A47L 11/4055; A47L 9/009; A47L 9/0009
USPC ........... 15/333, 354, 355, 356, 357, 358, 361, 15/401, 393; 280/79.11, 47.34
See application file for complete search history.

(56) References Cited

U.S. PATENT DOCUMENTS

| 1,572,913 | A | | 2/1926 | Finnell |
| 1,923,689 | A | | 8/1933 | Rosenberg |
| 2,876,484 | A | | 3/1959 | Wells |
| 2,914,791 | A | * | 12/1959 | Wells ............................... 15/345 |
| 2,969,557 | A | | 1/1961 | Petersen |
| 3,063,082 | A | | 11/1962 | Rosenberg |
| 3,065,490 | A | | 11/1962 | Arones |
| 4,222,145 | A | | 9/1980 | Lowder |
| 4,616,378 | A | * | 10/1986 | Berfield et al. ................. 15/353 |
| 4,809,396 | A | | 3/1989 | Houser |
| 5,354,347 | A | | 10/1994 | McCoy et al. |
| 5,377,382 | A | | 1/1995 | Bores et al. |
| 5,846,334 | A | | 12/1998 | Hoce |
| 7,185,389 | B2 | | 3/2007 | Thomason et al. |

OTHER PUBLICATIONS

Nobles Industries, "Typhoon EV", Operator & Parts Manual, Oct. 1997.

* cited by examiner

*Primary Examiner* — Mark Spisich
*Assistant Examiner* — Andrew A Horton
(74) *Attorney, Agent, or Firm* — Sutton McAughan Deaver, PLLC (57) ABSTRACT

A tool assembly for a vacuum appliance, such as a wet/dry vacuum cleaner, is described, wherein the tool assembly may include a frame, a mount configured to couple the frame to the appliance, a pivot, an actuator configured to support the frame in one or more positions, and a tool coupled to the frame. The assembly may also include a biasing device between the pivot and an end of the frame, and may be disposed in one or more positions relative to a vacuum surface. Also described is a vacuum appliance system that can include a debris collector, a power head assembly, a base, and a tool assembly. Such a vacuum appliance system can also include a main wheel assembly and a plurality of optional main wheel assembly mounting locations. The system may further include a quick-release filter cage coupled to the power head assembly.

15 Claims, 12 Drawing Sheets

VACUUM APPLIANCE WITH ADJUSTABLE TOOL SUPPORT SYSTEM AND METHOD OF USE

CROSS REFERENCE TO RELATED APPLICATIONS

This application claims priority to U.S. Provisional Patent Application Ser. No. 61/542,281, filed Oct. 3, 2011, the contents of which are incorporated herein by reference in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The invention disclosed and taught herein relates generally to vacuum appliances, and more specifically relates to vacuum appliances such as vacuum cleaners having adjustable tool support systems.

2. Description of the Related Art

Typically, mechanism-type actuators are moved one way to engage, and another way to disengage a mechanism being acted upon. Take, for example, the latch on the lid of a plastic storage box or tool box: to open the lid, the latch may move one way to release the latch so that the lid can be removed or opened. Conversely, to secure the lid back in a closed position, the latch will probably need to be moved the opposite direction. The same principles can also be illustrated with reference to a spring-loaded ratchet device. One such example is a common "come-a-long" hand winch. As one pulls on the lever to crank the cable, a spring-loaded catch snaps against notches to keep the cable from unwinding. To release the cable, one would employ a second action of moving the catch away from the notches.

As a further example of this type of mechanical actuation, one can consider the operation of a typical household deadbolt door lock. A key or handle may be turned one direction to lock the deadbolt, and the opposite direction to unlock the deadbolt. However, in one or more applications, it may be advantageous to use a mechanism actuator that can be activated and deactivated using similar, or the same, inputs or motions. Although the present invention can be used in numerous applications, it will be disclosed in one of many applications for illustrative purposes.

A vacuum appliance, such as a wet/dry or work area vacuum cleaner, may have a vacuum tool mounted on the vacuum body, in particular to the bottom region (in whole or in part) of the vacuum body, such as for scrubbing or otherwise cleaning one or more surfaces during vacuuming. For example, a vacuum appliance may have a squeegee, brush, blade, or other tool mounted on or in association with the front of the unit. Attached to the tool may be a hose that couples to the inlet of the vacuum cleaner drum such that suction air and vacuumed debris flow from the tool through the hose and into the collection drum of the vacuum.

In many applications, the tool may be adjustably mounted to the vacuum cleaner so that the tool can be selectively applied to a vacuum surface when desired and removed from the surface when not in use. For example, the tool may be lifted from the surface and supported in an "up" or elevated position when not in use, and may be released or otherwise supported in a "down" or lowered position during vacuuming so that the tool can contact the surface being vacuumed. Therefore, it would be advantageous for a support system to hold, dispose or otherwise support the tool in two or more positions and allow a user to switch the tool between positions using simple and similar user input actions.

The invention disclosed and taught herein is directed to an improved support system for use with devices, such as vacuum appliances (e.g., wet/dry vacuum appliances) that engages and disengages from positions, settings, and the like using similar actuator motions and a minimal number of parts.

BRIEF SUMMARY OF THE INVENTION

A tool assembly for a vacuum appliance may include a frame having a first end and a longitudinally opposite second end, a mount configured to couple the frame to the vacuum appliance, a pivot coupled to the frame between the first and second ends so that the frame can rotate about the pivot, an actuator coupled to the first end of the frame and configured to support the frame in at least one of a first position and a second position, and a tool coupled to the second end of the frame.

The tool assembly may include a biasing device coupled to the frame between the pivot and one of the first and second ends, and the frame may be pivotally coupled to the mount. The tool assembly may include a pedal coupled to the frame and moveable between a first pedal position and second pedal position, wherein the tool assembly is configured to support the frame in the first position when the pedal is in the first pedal position, and wherein the tool assembly is configured to support the frame in the second position when the pedal is in the second pedal position.

The assembly may include a pedal locking plate configured to cooperate with the pedal to releasably lock the pedal in one or more of the first and second pedal positions. The pedal may be biased toward at least one of the first and second pedal positions. The tool may be disposed distally from a surface to be vacuumed when the frame is in the first position, and the tool may contact the surface when the frame is in the second position. The actuator may support at least a portion of the weight of the tool in one or more positions.

The tool assembly can further include an opening, orifice, or the like in the frame between the first and second ends. The tool assembly's biasing device can be configured to pass through the orifice. The biasing device can include a first end configured to couple to the vacuum appliance and a second end configured to couple to the frame with a pin, rod, or other support element. Furthermore, the tool assembly can include a reinforcement plate coupled to the frame, a spring having a first end coupled to the pedal and a second end coupled to the reinforcement plate. The spring can bias the pedal toward at least one of the first and second pedal positions.

A vacuum appliance system may include a debris collector coupled to an air inlet, a power head assembly having an air outlet, and an electric vacuum motor fluidicly coupled between the air inlet and the air outlet. The system can further include a tool assembly coupled to the collector and a conduit having a first end coupled to the tool and a second end coupled to the air inlet. The tool may be a squeegee, a brush, a blade, another tool, or any combination thereof. The system may include a base, wherein the collector is coupled to the top of the base and the tool assembly is coupled to the bottom of the base.

A vacuum appliance system may include a main wheel assembly, a base having a plurality of optional main wheel assembly mounting locations between the first and second ends, and at least one bracket configured to couple the main wheel assembly to at least one of the mounting locations.

A vacuum appliance system may include a quick-release filter cage coupled to the power head assembly and configured to be fluidicly disposed between the air inlet and the motor during vacuuming. The filter cage may include one or more couplers that communicate with the power head assembly to removably couple the filter cage to the power head assembly.

A wheel assembly for a vacuum appliance may include a base configured to couple to the vacuum appliance, a main wheel assembly, and at least one bracket configured to couple the main wheel assembly to the bottom of the base in one of at least two optional main wheel assembly mounting locations between the first and second ends of the base. The wheel assembly may include at least one secondary wheel configured to couple to the bottom of the base.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION OF THE INVENTION

The Figures described above and the written description of specific structures and functions below are not presented to limit the scope of what Applicants have invented or the scope of the appended claims. Rather, the Figures and written description are provided to teach any person skilled in the art to make and use the invention for which patent protection is sought. Those skilled in the art will appreciate that not all features of a commercial embodiment of the invention are described or shown for the sake of clarity and understanding. Persons of skill in this art will also appreciate that the development of an actual commercial embodiment incorporating aspects of the present invention will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time.

While a developer's efforts might be complex and time-consuming in an absolute sense, such efforts would be, nevertheless, a routine undertaking for those of skill in this art having benefit of this disclosure. It must be understood that the invention disclosed and taught herein is susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly, or indirectly with intermediate elements, one or more pieces of members together and can further include without limitation integrally forming one functional member with another in a unity fashion. The coupling can occur in any direction, including rotationally.

Applicants have created a system for supporting one or more objects in one or more positions, and for moving the one or more objects between the positions. While the support system has many applications, the system is described herein with respect to a vacuum appliance tool application for illustrative purposes. The support system may include a first component for coupling with an object and for supporting the object in one or more positions. The first component may be moveably coupled to a device, system, or other body, such as to support the object in the one or more positions relative to the body. The system may include an actuator for cooperating with the first component to support the object, such as by holding or releasing the object in one or more positions, or moving the object between positions, and structure for coupling the system to the body.

It should be noted that the term "support," iterations thereof, and like terms, are used broadly herein and specifically include, without limitation, holding, affecting, sustaining, disposing, communicating with, or otherwise being related to. For example, support may include bearing weight, in any manner or degree, but need not, and may alternatively include releasing such weight, in whole or in part.

Figure 1:
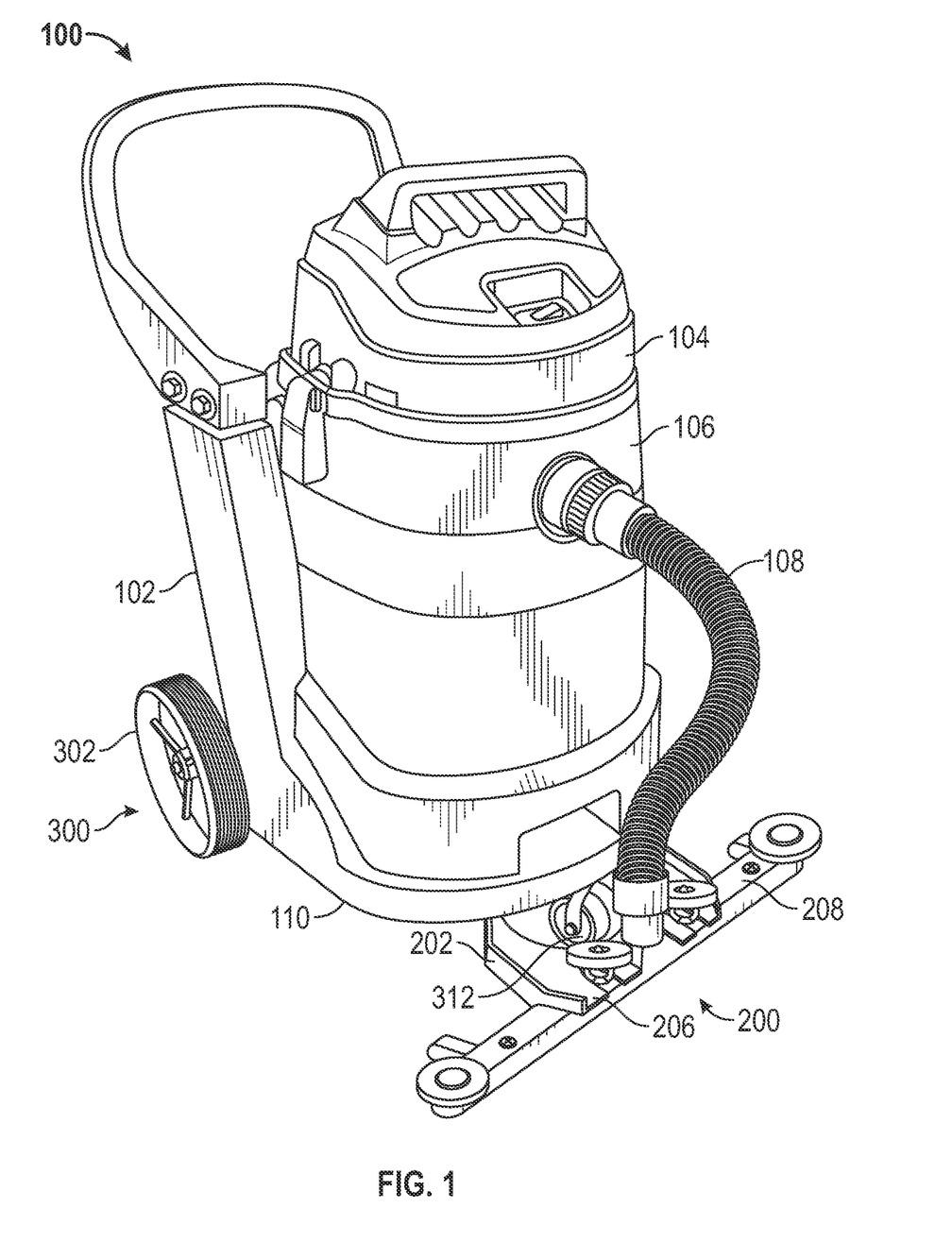
FIG. 1 is a front perspective view of one of many embodiments of a vacuum appliance system in a rear-wheel configuration and utilizing certain aspects of the present invention.
Figure 2:
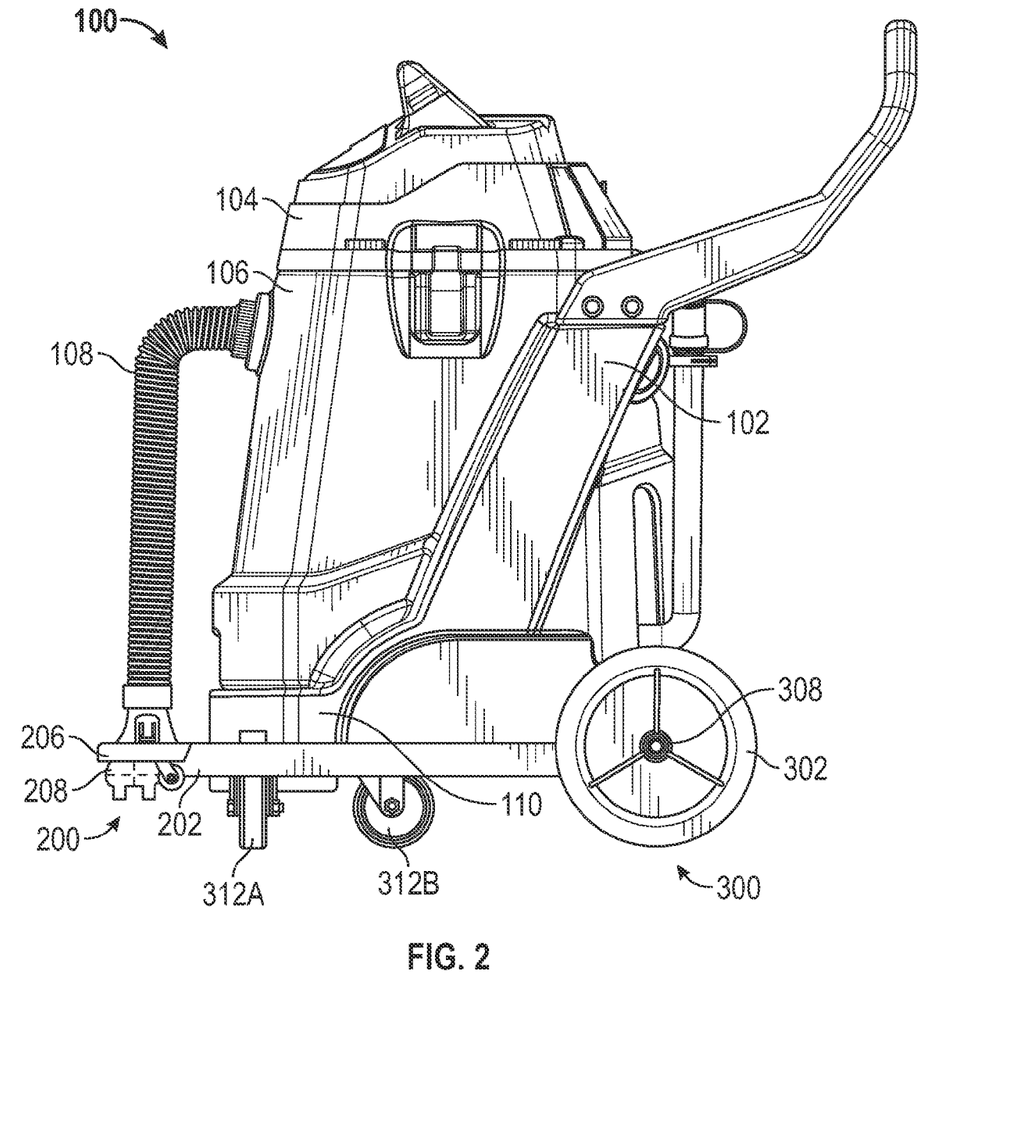
FIG. 2 is a side view of the embodiment of FIG. 1.
Figure 3:
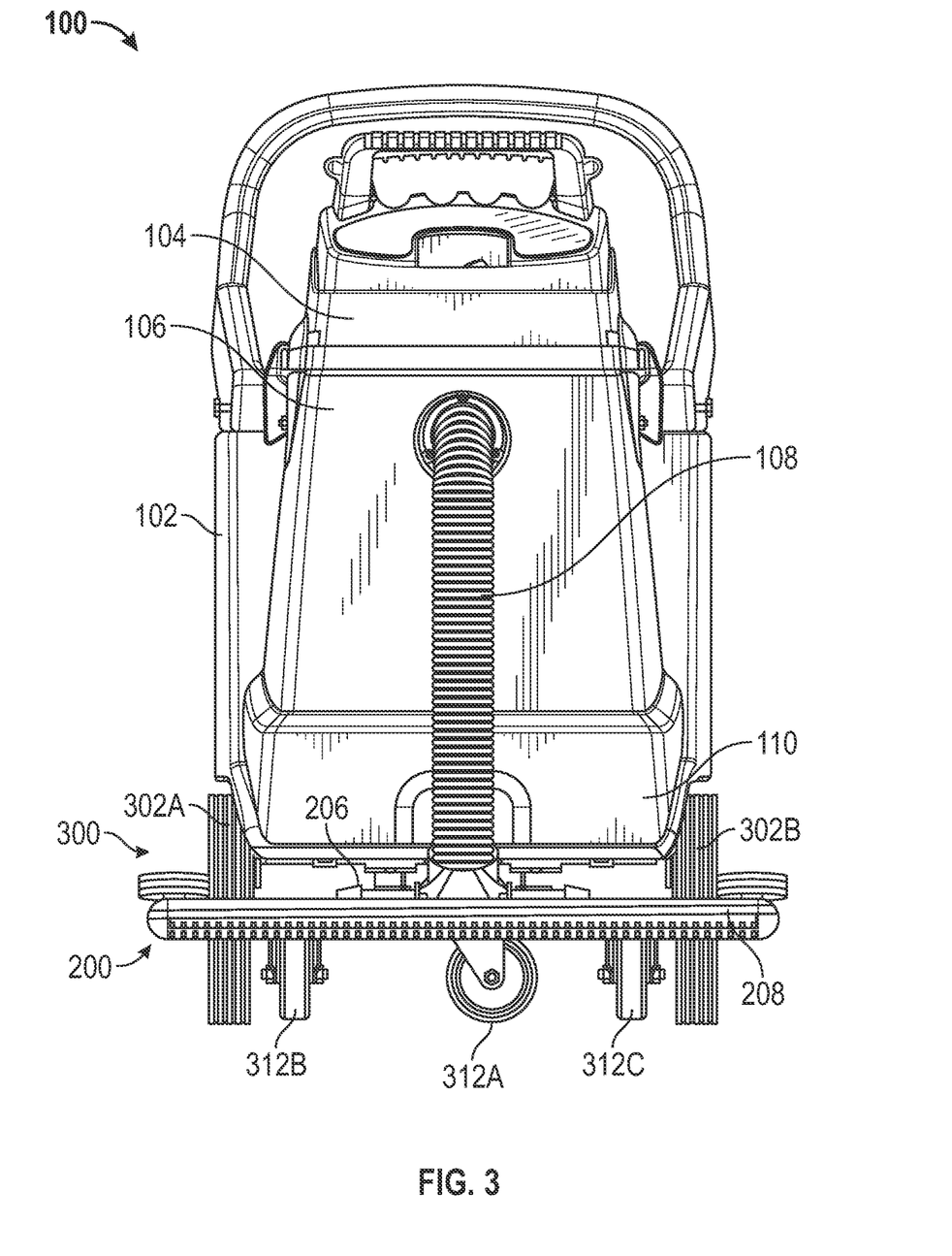
FIG. 3 is a front view of the embodiment of FIGS. 1-2.
Figure 4:
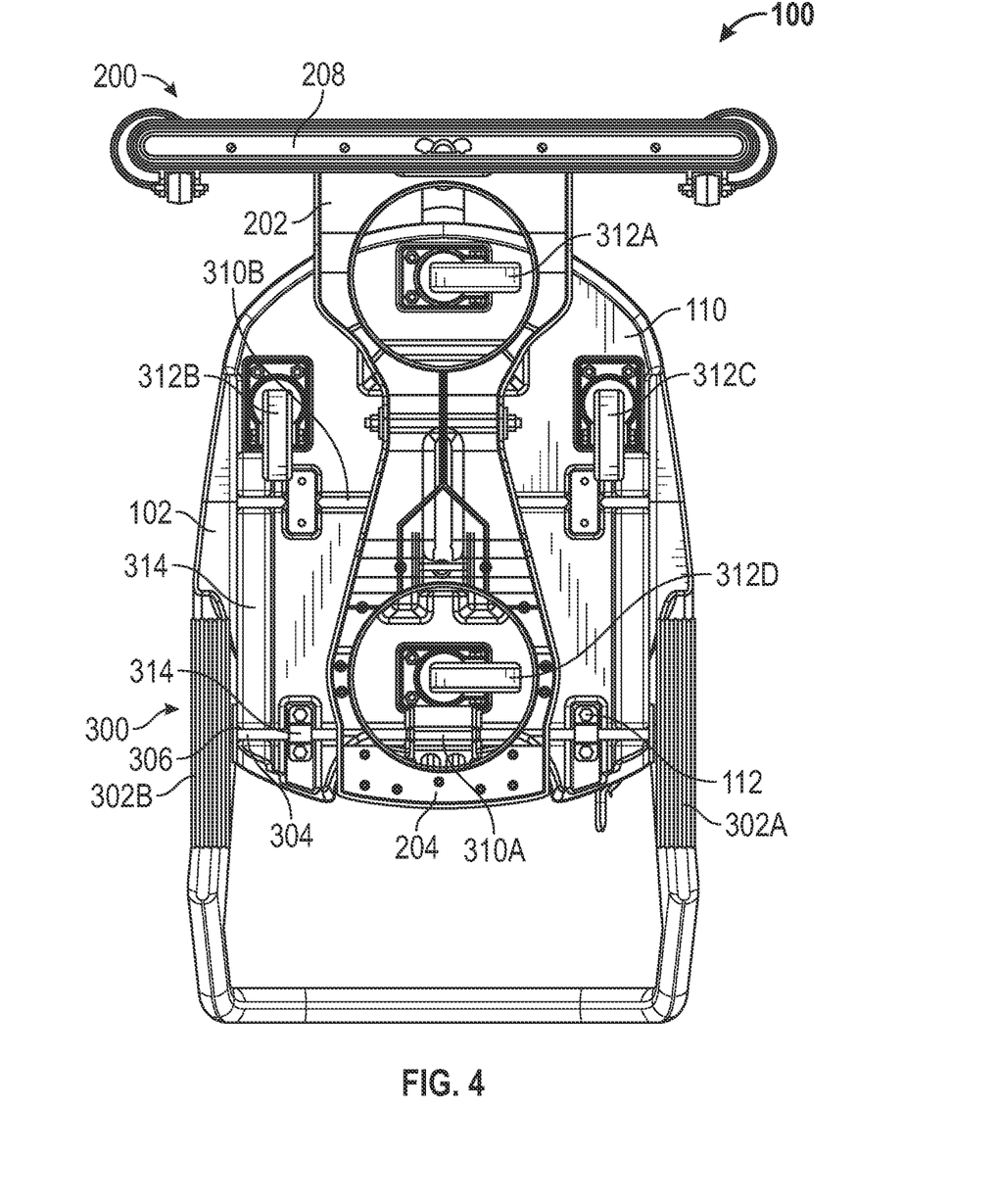
FIG. 4 is a bottom view of the embodiment of FIGS. 1-3.

Turning now to the figures, FIG. 1 is a front perspective view of one of many embodiments of a vacuum appliance system 100 in a rear-wheel configuration and utilizing certain aspects of the present invention. FIG. 2 is a side view of the embodiment of FIG. 1. FIG. 3 is a front view of the embodiment of FIGS. 1-2. FIG. 4 is a bottom view of the embodiment of FIGS. 1-3. FIGS. 1-4 will be described in conjunction with one another.

Vacuum appliance system 100 may generally include a vacuum appliance 102 having a tool assembly 200 and a wheel assembly 300 coupled thereto, separately or in combination. Vacuum appliance 102 may be any vacuum cleaner, such as a conventional wet/dry vacuum cleaner, or any other conventional vacuum cleaner such as an upright vacuum, which may generally include a power head 104, which may comprise a vacuum motor, motor cover, electric cord, controls, and other vacuum components, coupled to a collector 106 and a vacuum hose 108. Vacuum appliance 102 may include other vacuum components, such as handles, wheels, attachments, nozzles, filters, cages, inlets, outlets, and the like, separately or in combination with other components, as will be readily understood by one of ordinary skill and which may, but need not, be further described herein while nonetheless being present in a commercial embodiment of Applicants' invention.

Figure 14:
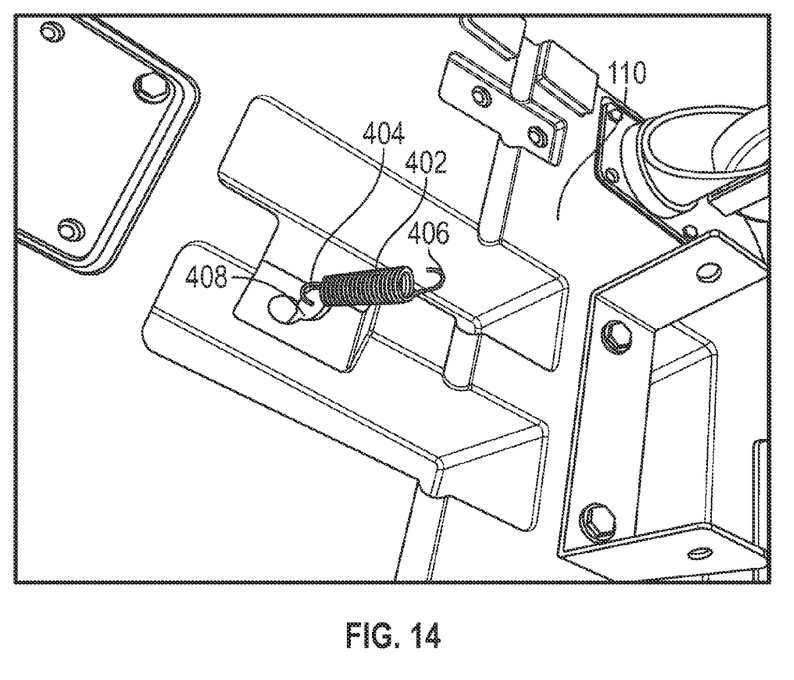
FIG. 14 is a perspective view of the extension device mounted to the base of the vacuum appliance.

In at least one embodiment, system 100 may include a base 110, such as a frame or support member, disposed at least partially between vacuum appliance 102 and a surface to be vacuumed, such as a floor. Base 110 may support one or more other components of system 100, such as handles, wheels, and the like, as required by a particular application. Base 110 may be formed integrally with vacuum appliance 102, such as with collector 106, but need not be, and may alternatively be formed separately and coupled thereto, in whole or in part. Furthermore, an extension device 402 (as shown in FIG. 14) can be coupled to base 110, as further described below.

Tool assembly 200 may include a frame 202, such as a pivot plate or other structure, for supporting one or more other components of system 100, such as by coupling one or more components to vacuum appliance 102. Frame 202 may be any shape or form required by a particular application, such as those specifically described herein, and may preferably be formed from plastic for purposes of durability, corrosion resistance and minimizing weight. However, it need not be, and may alternatively be formed from metal, wood, composite, or any other material required by a particular application.

As shown in the exemplary embodiment of FIGS. 1-4, frame 202 may have a first end 204 configured to communicate with a user, such as for manipulating the position or arrangement of frame 202 relative to vacuum appliance 102, or another point or body, such as a surface on which system 100 rests. For example, first end 204 may include an actuator 210 (shown in FIG. 7) for moving and otherwise supporting frame 202, such as between two or more positions, as further described below.

Frame 202 may include a second end 206 configured to couple to one or more tools 208, such as a tool used during vacuuming, whether constantly, optionally, or otherwise. Examples of tools 208 that maybe used with assembly 200 or system 100 may include, without limitation, squeegees, brushes, blades, tapered nozzles, crevasse tools, and other tools known in the art, whether used separately or in combination. Tool 208 may be coupled to frame 202, such as to second end 206, in any manner required by a particular application, including permanently or replaceably. In the embodiment of FIGS. 1-4, tool 208 is shown to be a squeegee for illustrative, non-limiting purposes.

Tool assembly 200 may be configured to couple with vacuum appliance 102 in any manner required by a particular application, and typically may include mounting hardware, such as brackets, fasteners, and other components, as will be readily understood by one of ordinary skill. In at least one embodiment, tool assembly 200 may be moveably coupled to vacuum appliance 102 so that tool 208 may optionally communicate with a vacuum surface, as will be further described below. For example, frame 202 may pivot about an axis so that tool 208 may be supported in one or more positions, such as a first position wherein tool 208 is disposed above a vacuum surface such that the tool 208 is not disposed in contact with the vacuum surface (e.g., an "up" position) and a second position wherein tool 208 is disposed in contact with the vacuum surface (e.g., a "down" position), as will likewise be further described below.

Wheel assembly 300 may generally include one or more wheels, such as main wheels 302A, 302B (collectively "main wheels 302"), rotatably coupled to one or more supports, such as main axle 304. Axle 304 may be a single axle, but need not be, and may alternatively include any number of supports or axles required by a particular application, such as two or more. Each main wheel 302 may be coupled to axle 304 in any manner required by a particular application, such as by disposing each wheel between a wheel spacer 306 and axle cap 308, or alternatively by using any other conventional manner known in the art. By employing the use of the wheel spacer 306 and axle cap 308 in conjunction with axle bracket 314, the wheel assembly 300 can easily be coupled to, or uncoupled from, the remaining components of the vacuum appliance 102 as a single component thus increasing the rate in which a user can reconfigure the vacuum appliance 102 in the rear-wheel, or center mount configurations.

Main wheels 302 can include any wheel, inflatable, solid, hollow, or otherwise, and may preferably include caster-type wheels having a solid rubber tread so as to minimize the need for frequent inflation, maintenance, and the like. Wheel assembly 300 may be configured to couple with vacuum appliance 102 in any manner required by a particular application, and typically may include mounting hardware, such as brackets, fasteners and other components, as will be readily understood by one of ordinary skill.

In at least one embodiment, wheel assembly 300 may be coupled to vacuum appliance 102 so that assembly 300 may be quickly and easily coupled with, including being interchangeable between, any one of a plurality of main wheel assembly mounting locations, such as locations 310A, 310B. Because the wheel assembly locations (e.g., 310A, 310B) are interchangeable, a user may quickly adjust the location of the main wheels 302 to suit the user's particular application. In other embodiments, the vacuum appliance 102 may be adapted to include more than two locations, thus further increasing the versatility of the wheel placement.

Wheel assembly 300 may include one or more secondary wheels 312A, 312B, 312C (collectively "secondary wheels 312") for supporting system 100 on a surface. Each secondary wheel 312 may include any wheel required by a particular application, and may preferably be one selected among any caster known in the art, such as a unitary caster, which may include brackets, axles, bearings, or other hardware for rotationally coupling a wheel to a body. In one embodiment, the vacuum appliance can include a roll-around base that includes a center wheel or conventional rear-wheel mount configuration.

In the embodiment of FIGS. 1-4, three secondary wheels 312 are shown for illustrative purposes. However, one or more embodiments of system 100 may include one, two, or three or more secondary wheels, as required by a particular application. Like main wheels 302, each secondary wheel 312 may, but need not, be interchangeable between two or more locations on system 100, such as on the bottom of vacuum appliance 102. Alternatively, one or more secondary wheels 312 may be optional, such as between configurations of a particular embodiment, as further described below.

System 100, tool assembly 200 and wheel assembly 300 having been described generally above, one or more preferable embodiments of system 100, which may include tool assembly 200 and wheel assembly 300, separately or in combination, will now be described in more detail for illustrative purposes. With continuing reference to FIGS. 1-4, wheel assembly 300 may be adapted to couple to vacuum appliance 102, such as to base 110, in a plurality of configurations, any one of which may be chosen and instituted by a user as desired. For example, as shown in FIGS. 1-4 (referred to herein as a "rear-wheel configuration" for ease of reference), wheel assembly 300 may be coupled to mounting location 310A toward the rear of system 100.

Wheel assembly 300 may include one or more main wheel couplers 314, such as brackets or mounts, for coupling axle 304 and main wheels 302 to appliance 102. For example, base 110 can include one or more main wheel receptacles 112 for communicating with couplers 314. System 100 may include fasteners (not shown), such as screws, snaps, hooks, buttons, bolts, clips, catches, clasps, or any other means for coupling or fastening couplers 314 and receptacles 112, as will be readily understood by one of ordinary skill. In one embodiment, the fasteners can include one or more thumb-tightening screws to couple the couplers 314 to the appliance 102. In this embodiment, a user can simply hand-tighten or hand-loosen the screws coupled to the couplers 314 for coupling the axle 304 to, and decoupling the axle 304 from, the appliance. By doing so, the user can quickly and efficiently adjust the location of the axle 304 without the need for other tools, such as wrenches or screwdrivers.

In the rear-wheel configuration, one or more secondary wheels 312 may be coupled toward the front of system 100 for supporting system 100 on a vacuum surface in cooperation with main wheels 302. Secondary wheels 312 may be arranged in any order or number required by a particular application. Additionally, because the vacuum appliance 102 can be embodied in a compact design, in the rear-wheel configuration, the appliance 102 can easily clear stairs, curbs, or other obstacles or hindrances during its operation.

Figure 5:
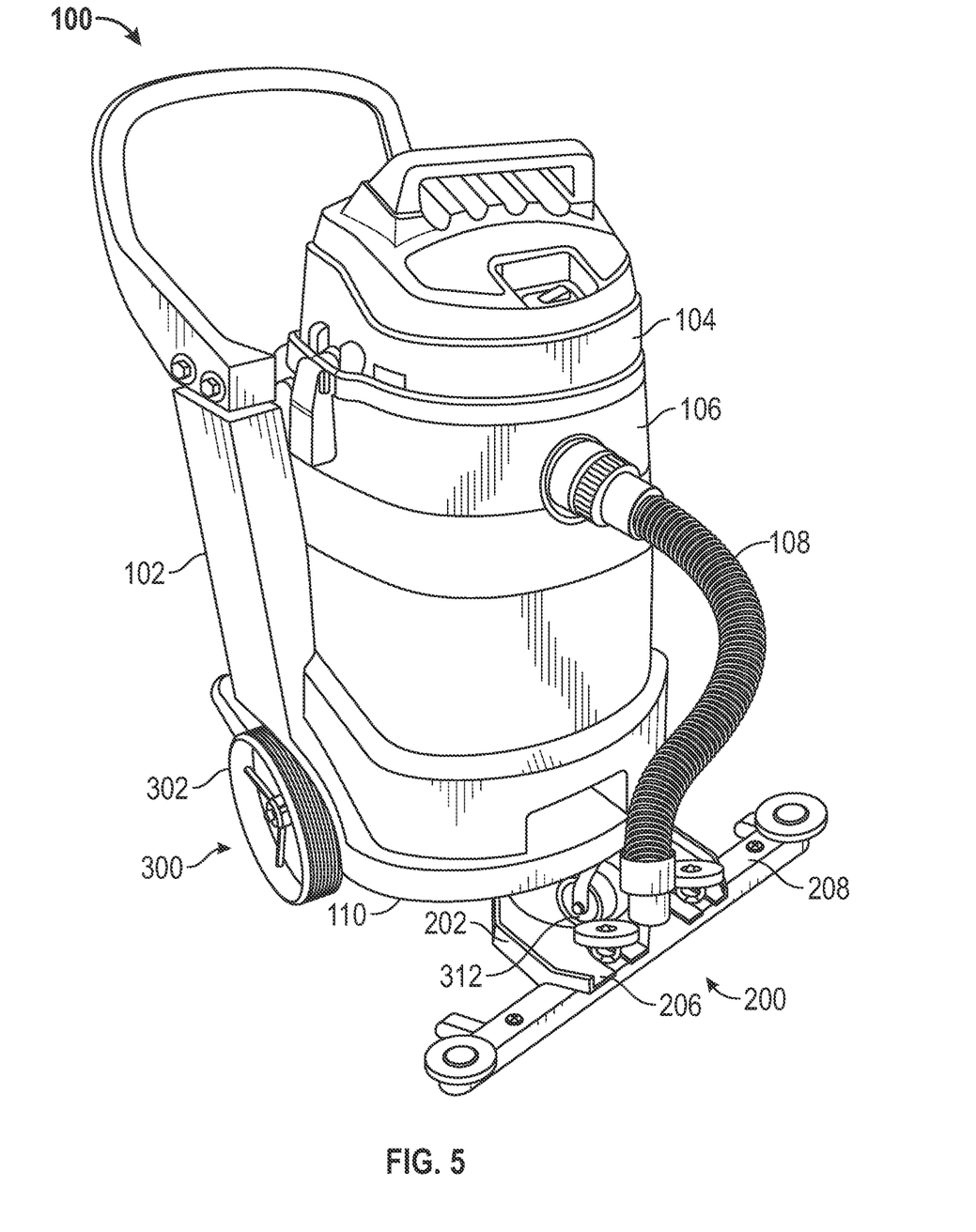
FIG. 5 is a front perspective view of one of many embodiments of a vacuum appliance system in a center-wheel configuration and utilizing certain aspects of the present invention.
Figure 6:
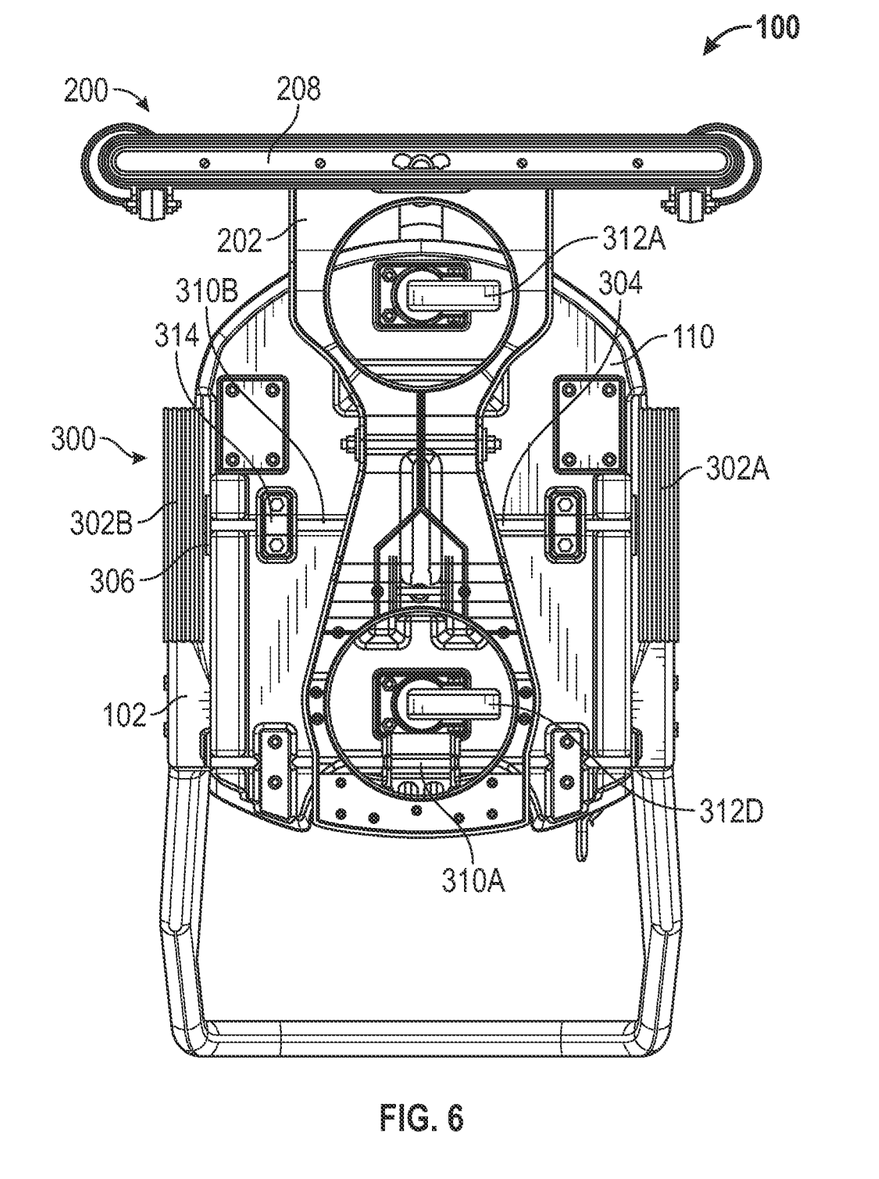
FIG. 6 is a bottom view of the embodiment of FIG. 5.

FIG. 5 is a front perspective view of one of many embodiments of a vacuum appliance system 100 in a center-wheel configuration and utilizing certain aspects of the present invention. FIG. 6 is a bottom view of the embodiment of FIG. 5. FIGS. 5-6 will be described in conjunction with one another. FIGS. 5 and 6 show another embodiment among many interchangeable configurations of system 100. For example, as shown in FIGS. 5-6 (referred to herein as a "center-wheel configuration" for ease of reference), wheel assembly 300 may be coupled to mounting location 310B, such as toward the center or middle of system 100. Wheel assembly 300 may include one or more main wheel couplers 314, such as brackets or mounts, for coupling axle 304 and main wheels 302 to appliance 102. For example, base 110 can include one or more main wheel receptacles 112 for communicating with couplers 314.

System 100 may include fasteners (not shown), such as screws, snaps, hooks, button, bolts, clips, catches, clasps, or any other means for coupling or fastening couplers 314 and receptacles 112, as will be readily understood by one of ordinary skill. One or more of these components, such as couplers 314, fasteners, or other components, may be the same as those used in the rear-wheel configuration, but need not be, and alternatively may be different. In the center-wheel configuration, one or more secondary wheels 312 may be coupled toward the front and rear of system 100, separately or in combination, for supporting system 100 on a vacuum surface in cooperation with main wheels 302. This configuration can improve the overall maneuverability of the vacuum appliance 102. Secondary wheels 312 may be arranged in any order or number as required by a particular application. Secondary wheels 312 can include any type of wheel, such as solid, hollow, inflatable, casters, rubber coated, or the like.

Figure 7:
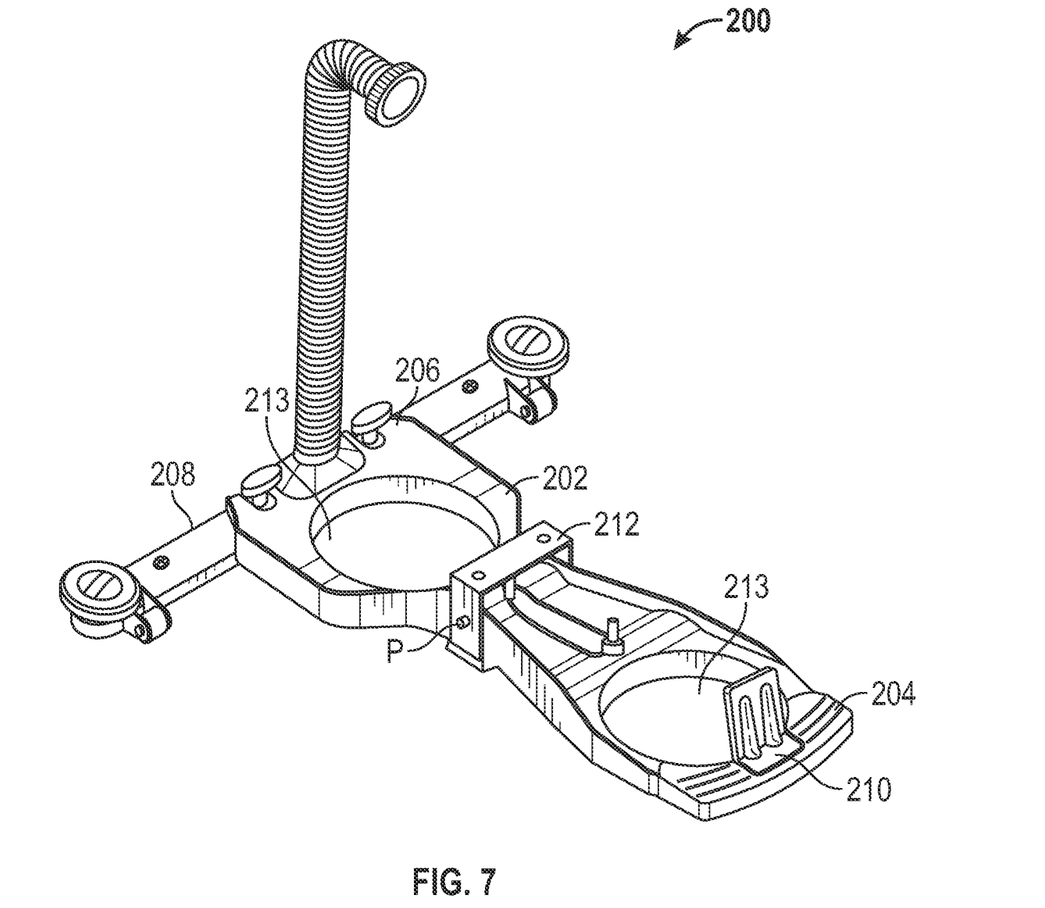
FIG. 7 is a rear perspective view of one of many embodiments of a tool assembly utilizing certain aspects of the present invention.
Figure 8:
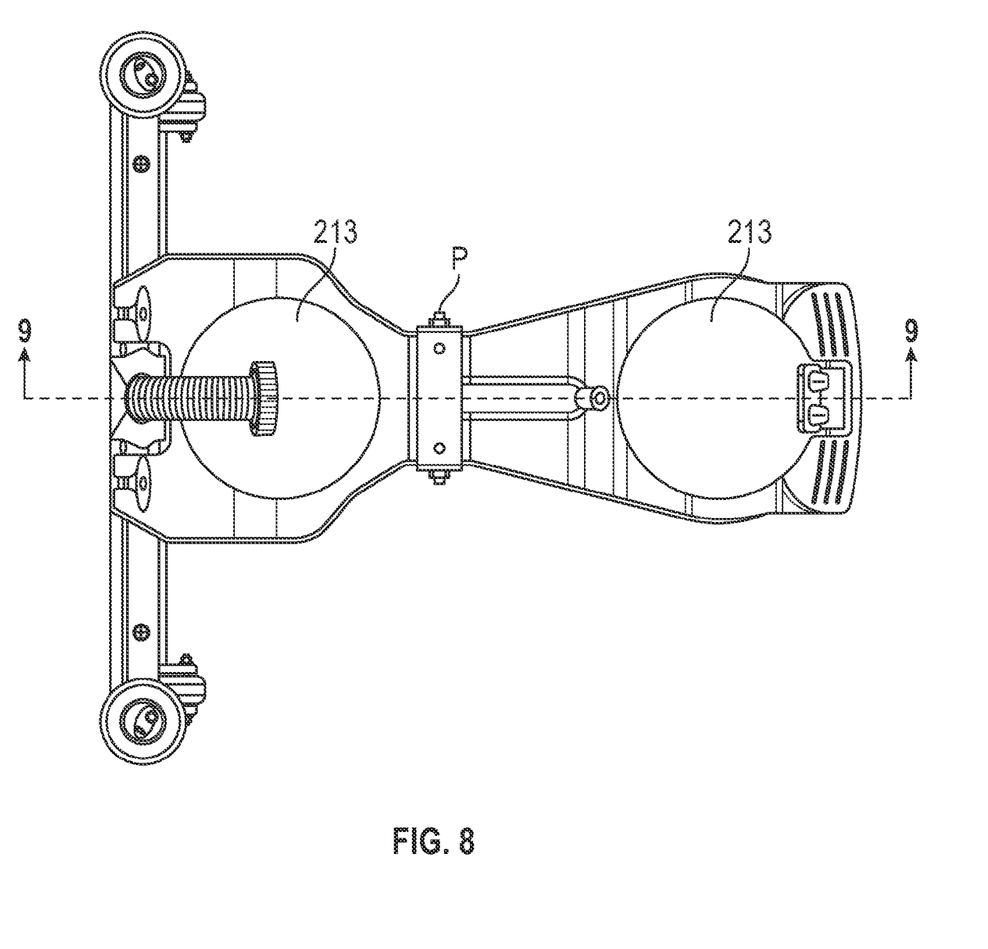
FIG. 8 is a top view of the embodiment of FIG. 7.
Figure 9:
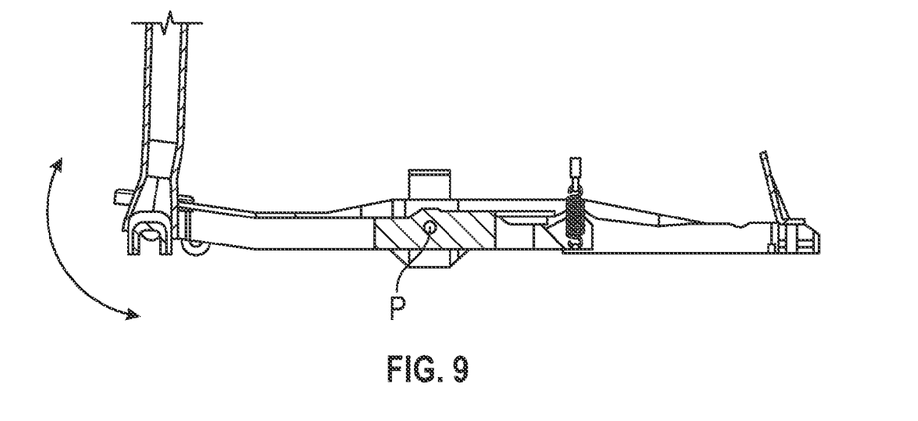
FIG. 9 is a side view of the embodiment of FIGS. 7-8.

FIG. 7 is a rear perspective view of one of many embodiments of a tool assembly 200 utilizing certain aspects of the present invention. FIG. 8 is a top view of the embodiment of FIG. 7. FIG. 9 is a side view of the embodiment of FIGS. 7-8. FIGS. 7-9 will be described in conjunction with one another. One or more of the basic components for tool assembly 200 having been described above, FIGS. 7-9 show one of many preferred embodiments of the present invention for illustrative purposes. As mentioned above, frame 202 may include a first end 204 having an actuator 210 and a second end 206 configured to couple to a vacuum tool 208.

Assembly 200 may include one or more mounts 212, such as a bracket, support, brace, strut, or other coupler, for movably coupling assembly 200 to appliance 102 (as shown in FIG. 1) in any conventional manner, which may include the use of fasteners and the like. For example, frame 202 may be pivotally coupled to appliance 102 (as shown in FIG. 1) about a pivot P coupled to mount 212. Mount 212 can be coupled to the base 110 (as shown in FIG. 1) of the vacuum appliance so that it may be quickly coupled to, and decoupled from, the base. For example, the mount 212 can be coupled with hand-tightening screws or other fasteners that can allow a user to quickly and effectively replace the tool 208 (as shown in FIG. 1). In this configuration, the assembly 200 can be sold separately and easily replaced and interchanged based on the needs of a particular user.

Frame 202 may rotate about pivot P in one or more directions, for example, as indicated by the arrows in FIG. 9, and the frame 202 may thereby move or otherwise support tool 208 between a plurality of positions, such as the "up" and "down" positions described above, or any position between the "up" and "down" positions. Frame 202 may include an actuator 210, such as a pedal, bar, lever, or other device for transmitting or modifying a force in order to selectively dispose support tool 208 in one or more positions. Actuator 210 may communicate with one or more other components of system 100, such as a plate, notch, groove or other structure (not shown), to at least temporarily hold frame 202 and tool 208 in one or more positions rotated about Pivot P. Actuator 210 may, but need not, be biased toward a particular position, such as a locked or unlocked position. The actuator 210 can be embodied in a such manner such that the distance that the actuator 210 extends beyond the base 110 (as shown in FIG. 1) towards a user is minimized, without adversely affecting the user's ability to operate the actuator 210. By doing so, the vacuum appliance 102 (as shown in FIG. 1), implemented in this compact design, can easily clear stairs, curbs, or other obstacles or hindrances during its operation with causing the actuator 210 to contact any potentially impeding surfaces.

Frame 202 can further include one or more orifices 213 for receiving one or more of the secondary wheels 312. The orifices 213 can include any opening, cavity, aperture, outlet, or the like, and can be formed as part of the frame 202. Alternatively, the orifices 213 can include removable covers (not shown) that can coupled to, and decoupled from, each orifice 213 based on a user's preference, thus minimizing the openings in frame 202 depending on the wheel mounting configuration. The orifice can be employed to provide sufficient clearance through the frame 202 in various wheel mounting configurations. In another embodiment, the one or more orifices 213 can be omitted, and the frame 202 can be designed in order to minimize the obstructions near or around the secondary wheels 312. For example, the frame 202 can be designed to contain only the minimal amount of material in order to function in accordance with its description above. By doing so, the secondary wheels 312 can enjoy greater freedom of movement and placement on the vacuum appliance (as shown in FIG. 1).

Figure 10:
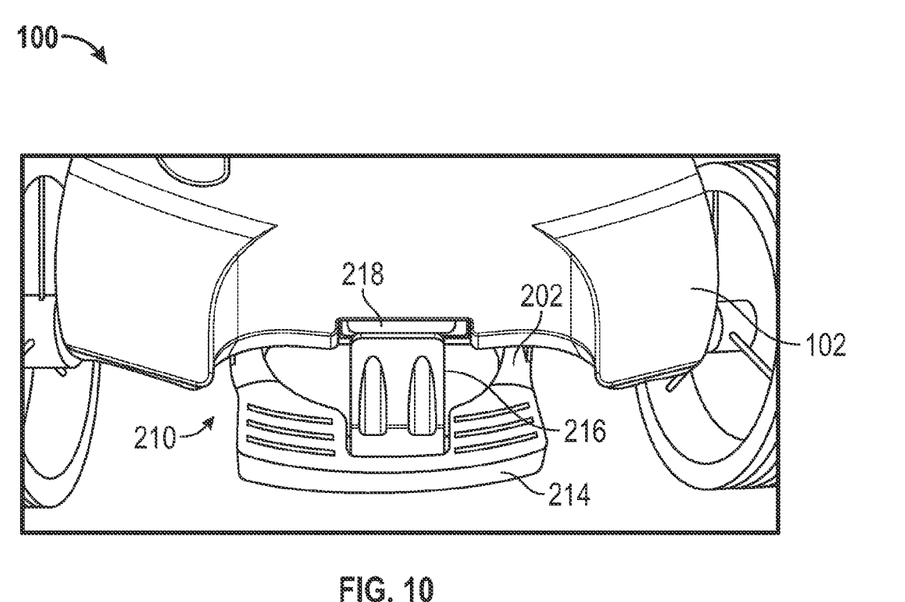
FIG. 10 is a partial rear perspective view of one of many embodiments of a vacuum appliance system having an actuator in a first position and utilizing certain aspects of the present invention.
Figure 11:
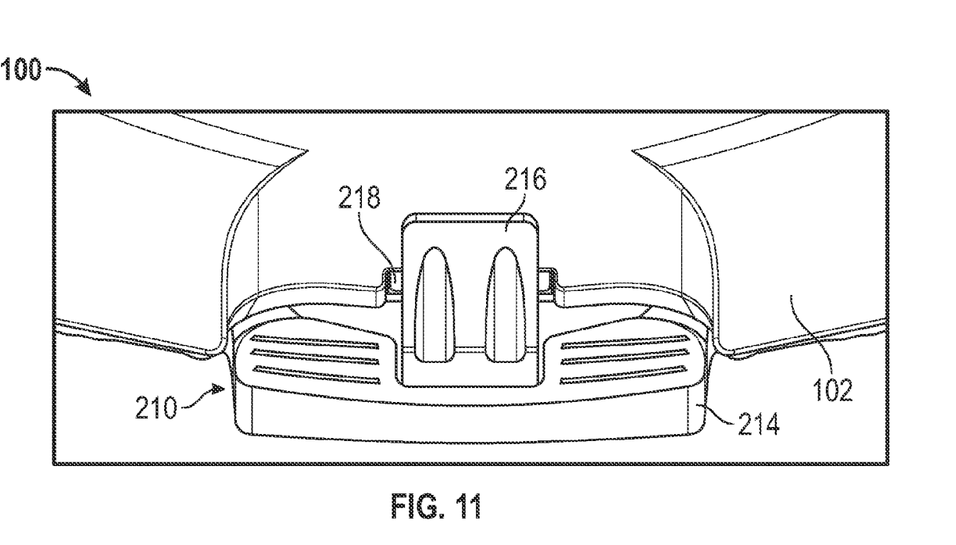
FIG. 11 illustrates the actuator of FIG. 10 in a second position.

FIG. 10 is a partial rear perspective view of one of many embodiments of a vacuum appliance system 100 having an actuator 210 in a first position and utilizing certain aspects of the present invention. FIG. 11 illustrates the actuator 210 of FIG. 10 in a second position. FIGS. 10-11 will be described in conjunction with one another. System 100 may be adapted to dispose a tool 208 (e.g., as shown in FIG. 9) in one or more positions, such as the "up" and "down" positions described above for illustrative purposes, and to hold the tool in one or more of the positions, such as using actuator 210. For example, in the exemplary embodiment of FIGS. 10-11, actuator 210 may include one or more components that communicate to optionally couple frame 202 in any of a plurality of positions as frame 202 rotates about pivot P.

Actuator 210 may include a pedal 214 coupled to frame 202, such as to an end opposite from tool 208, and pedal 214 may, for example, be disposed so that a user may depress the pedal, such as by stepping thereon, to cycle the system between positions, for example, about Pivot P. Actuator 210 may include a pedal lock 216 coupled to pedal 214 and adapted to communicate with a pedal latch plate 218, or another suitable component or portion of appliance 102 or system 100, to at least temporarily hold pedal 214 in one or more positions. Pedal lock 216 may, but need not, include a biasing device (not shown), such as a spring, band, cord, cable, or any other device for biasing the lock toward a particular position. Therefore, it can be seen that a user may toggle pedal 214 between first and second positions to hold tool 208 in one or more positions as frame 202 rotates about the pivot, as will be readily understood by one of ordinary skill having the benefits of the present disclosure. For example, pedal 214 may be pressed downwardly until lock 216 removably couples with plate 218 to hold pedal 214 in a down position and tool 208 in an up position (as shown in FIG. 10).

To move tool 208 from the up position, such as to a down position for vacuuming operations, pedal 214, including lock 216, may be pressed downwardly until lock 216 uncouples or disengages from plate 218. Pedal lock 216 may be at least temporarily held rearward (as shown in FIGS. 10-11) of plate 218, frame 202 may rotate about Pivot P, and pedal 214 may travel upwardly until lock 216 allows for sufficient clearance between it and the plate 218. When in a locked position, frame 202 can be prevented from rotating about Pivot P. Pedal 218 may be at least temporarily supported (whether biased or otherwise) in an up position and tool 208 in a down position (as shown in FIG. 11), as will be readily understood by one of ordinary skill having the benefits of the present disclosure.

Figure 12:
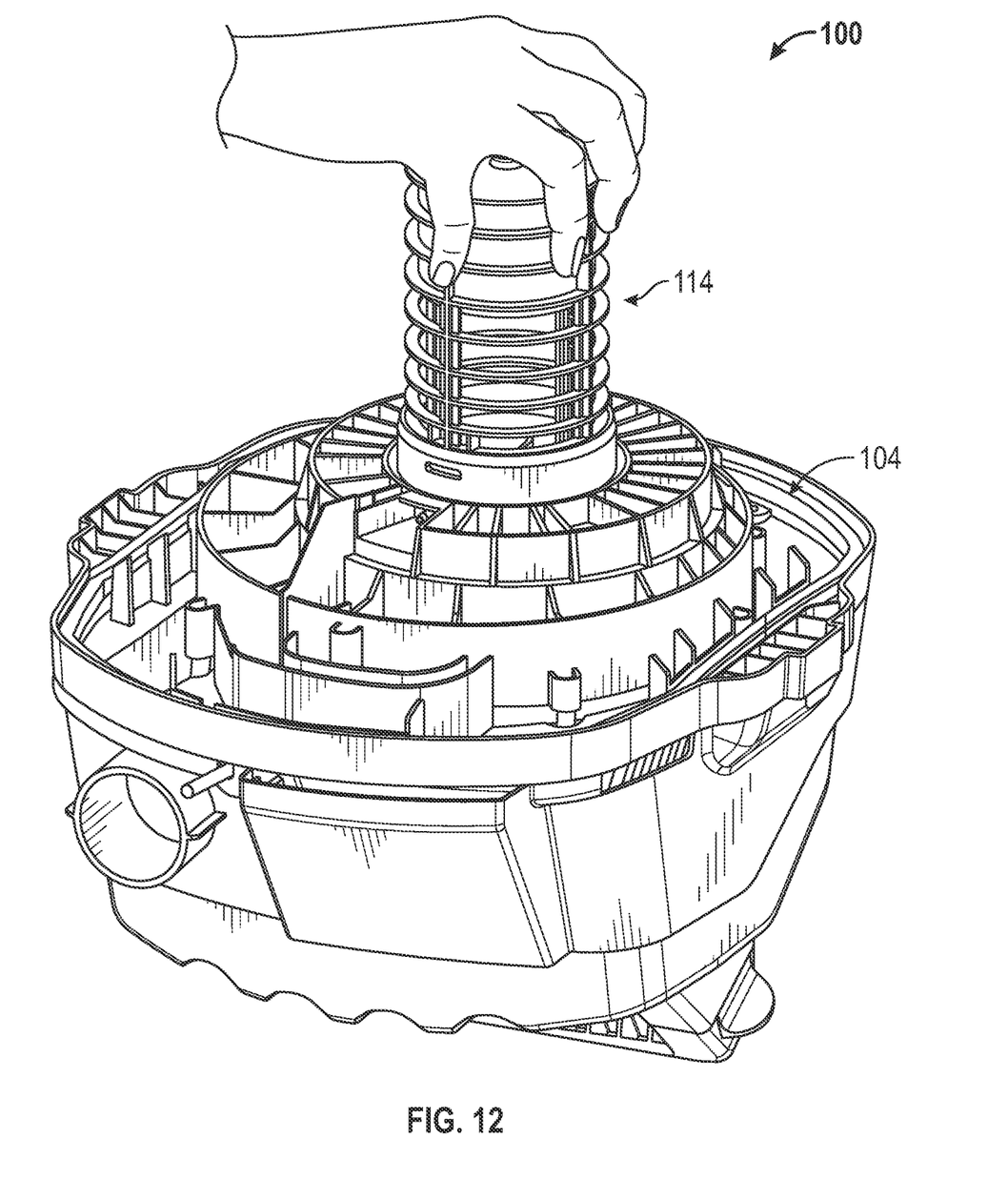
FIG. 12 is a bottom perspective view of one of many embodiments of vacuum appliance system having a quick release filter cage and utilizing certain aspects of the present invention.
Figure 13:
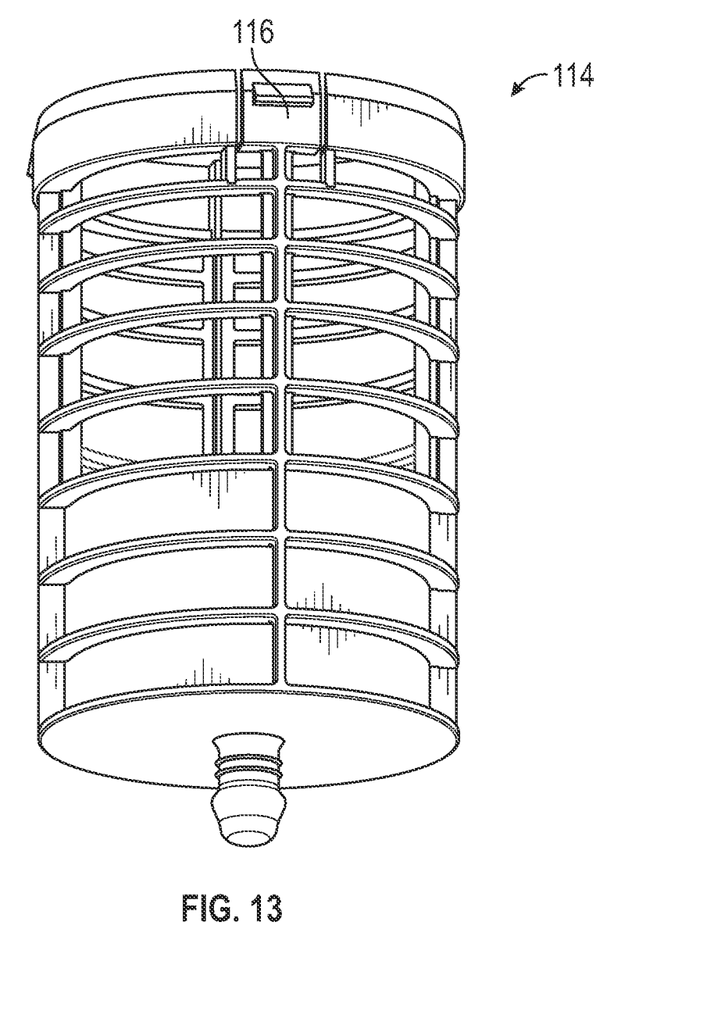
FIG. 13 is a side view of the filter cage of FIG. 10.

FIG. 12 is a bottom perspective view of one of many embodiments of vacuum appliance system 100 having a quick release filter cage 114 and float (not shown) utilizing certain aspects of the present invention. FIG. 13 is a side view of the filter cage 114 of FIG. 10. FIGS. 12-13 will be described in conjunction with one another. As described above, system 100 may typically include a power head 104 that supports a number of vacuum components, such as a motor, electronics, a power switch and other components known in the art. In at least one embodiment of the present invention, system 100 may include a filter cage 114 for removably coupling one or more air filters (not shown) to the vacuum appliance, such as to power head 104.

Filter cage 114 may preferably be a quick release filter cage configured to quickly couple to and uncouple from power head 104. Filter cage 114 may be coupled to the vacuum appliance in any manner required by a particular application and, in at least one embodiment, may preferably include one or more press tabs 116 for accomplishing the same. In other embodiments, the filter cage 114 may be coupled to the vacuum appliance with other fastening devices, such as screws, snaps, hooks, buttons, catches, clasps, bolts, clips, or any other means for coupling the filter cage 114 to the vacuum appliance. Filter cage 114 may enable a user to quickly and easily remove the cage and filter from the appliance for cleaning or replacement, such as without the need for additional hand tools.

Figure 15:
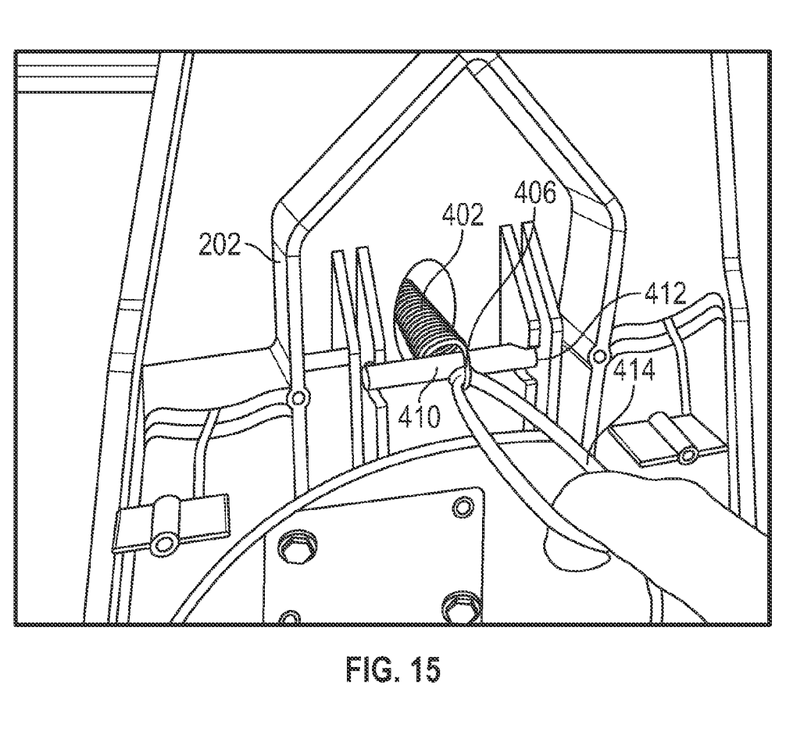
FIG. 15 is a perspective view of the extension device mounted to the frame.

FIG. 14 is a perspective view of the extension device mounted to the base of the vacuum appliance. FIG. 15 is a perspective view of the extension device mounted to the frame. These Figures will be described in conjunction with one another. When tool 208 (as shown in FIG. 1) is configured in down position, an extension device 402 can be employed in order to apply a sufficient downward force in order to keep the tool 208 pressed against the cleaning surface during use. The extension device 208 can include any spring, band, cord, cable, or any other device for applying a downward force to the tool 208. The extension device 402 can include a first end 404, and a second end 406. In one embodiment, the second end 406 can include a hook, snare, or other protrusion for gripping to, or wrapping around, a support element 410.

The first end 404 of the extension device 402 can be coupled to a fastener 408. The fastener 408 can include any screw, latch, snap, hook, button, bolt, clip, catch, clasp, or any other means for coupling or fastening the extension device 404 to the base 110. In one embodiment, the fastener 408 can include a thumb-tightening screw or other hand-tightening fastening mechanism to couple the extension device 402 to, and decouple it from, the base 110. In this embodiment, a user can adjust the fastener 408 simply by hand-tightening or hand-loosening the screws. The user can adjust the downward force (i.e., increase or decrease the magnitude of the force) based on the particular tool 208, and the user's preference. For example, a user would likely require more force when cleaning with a squeegee as compared to a brush. In one embodiment, the amount of force can be adjusted by tightening or loosening the fastener 408.

Referring to FIG. 15, the second end 406 of the extension device 402 can be routed through, or disposed at least partially within, the frame 202 and coupled with a support element 410. The support element 410 can include any pin, bar, brad, coupling, dowel, peg, rod, or the like for coupling to the second end 406 of the extension device 402. In one embodiment, a hand grip 414 can be employed to facilitate this routing. The hand grip 414 can include any strap, lace, belt, strip, leash, wire tie, or harness that can be coupled with the second end 406 of the extension device 402. Once coupled to the second end 406, a user can pull the extension device 402 in order to facilitate its coupling with the support element 410.

The support element 410 can be received in a support element mount 412. The support element mount 412 can include a recess, notch, indentation, or other dent or depressions, or the like, for receiving and seating the support element 410 For example, the second end 406 can include a hook and the support element 410 can include a pin. In this example, the pin can be received in the support element mount 412, such as a radial boss, in order to secure the extension device 402 to the frame 202. Once secured, the support element 410 can remain coupled to the frame 202 through the tension stored within the extension device 402.

Other and further embodiments utilizing one or more aspects of the invention described above can be devised without departing from the spirit of Applicants' invention. For example, one or more tool assemblies having any required capacity may be coupled with any device or machine, such as lifts, lawn mowers, tractors, heavy machinery, vacuum cleaners without wheels, vehicles, and other assemblies. Further, the various methods and embodiments of the system can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, the Applicants intend to fully protect all such modifications and improvements that come within the scope or range of equivalents of the following claims.

What is claimed is:

1. A tool assembly for a vacuum appliance, the tool assembly comprising:
   a frame having a first end and a longitudinally opposite second end;
   a mount configured to couple the frame to the vacuum appliance;
   a pivot coupled to the frame between the first and second ends so that the frame can rotate about the pivot;
   an actuator coupled to the first end of the frame and configured to support the frame in at least one of a first position and a second position;
   a tool coupled to the second end of the frame;
   a biasing device coupled to the frame between the pivot and one of the first and second ends so that the frame is biased to rotate about the pivot; and
   an opening in the frame between the first and second ends; wherein the biasing device is configured to pass through the opening, the biasing device having a first end configured to couple to the vacuum appliance and a second end configured to couple to the frame with a pin.

2. The tool assembly of claim 1, wherein the biasing device is a spring.

3. The tool assembly of claim 1, wherein the frame is pivotally coupled to the mount.

4. The tool assembly of claim 1, wherein the actuator further comprises:
   a pedal coupled to the frame and moveable between a first pedal position and second pedal position;
   wherein the tool assembly is configured to support the frame in the first position when the pedal is in the first pedal position; and
   wherein the tool assembly is configured to support the frame in the second position when the pedal is in the second pedal position.

5. The tool assembly of claim 4, further comprising a pedal locking plate configured to cooperate with the pedal to releasably lock the pedal in one or more of the first and second pedal positions.

6. The tool assembly of claim 4, wherein the pedal is biased toward at least one of the first and second pedal positions.

7. The tool assembly of claim 4, further comprising:
   a reinforcement plate coupled to the frame;
   a spring having a first end coupled to the pedal and a second end coupled to the reinforcement plate; and
   wherein the spring biases the pedal toward at least one of the first and second pedal positions.

8. The tool assembly of claim 1, wherein the tool is disposed distally from a surface to be vacuumed when the frame is in the first position, and wherein the tool contacts the surface when the frame is in the second position.

9. The tool assembly of claim 8, wherein when the frame is in the first position, the actuator supports at least a portion of a weight of the tool, and wherein when the frame is in the second position, the weight of the tool is released from the actuator thereby supporting the frame in the second position.

10. The tool assembly of claim 1, wherein the tool is selected from the group consisting of a squeegee, a brush, a blade, and any combination thereof.

11. The tool assembly of claim 1, wherein the frame has at least one opening configured to allow a wheel of the vacuum appliance to pass there through when the tool assembly is coupled to the vacuum appliance.

12. A tool assembly for a vacuum appliance, the tool assembly comprising:
    a frame having a first end and a longitudinally opposite second end;
    a mount configured to couple the frame to the vacuum appliance;
    a pivot coupled to the frame between the first and second ends so that the frame can rotate about the pivot;
    an actuator coupled to the first end of the frame and configured to support the frame in at least one of a first position and a second position;
    a tool coupled to the second end of the frame; and wherein the actuator further comprises:
    a pedal coupled to the frame and moveable between a first pedal position and second pedal position;
    wherein the tool assembly is configured to support the frame in the first position when the pedal is in the first pedal position; and
    wherein the tool assembly is configured to support the frame in the second position when the pedal is in the second pedal position.

13. The tool assembly of claim 12, further comprising a pedal locking plate configured to cooperate with the pedal to releasably lock the pedal in one or more of the first and second pedal positions.

14. The tool assembly of claim 12, wherein the pedal is biased toward at least one of the first and second pedal positions.

15. The tool assembly of claim 12, further comprising:
a reinforcement plate coupled to the frame;
a spring having a first end coupled to the pedal and a second end coupled to the reinforcement plate; and
wherein the spring biases the pedal toward at least one of the first and second pedal positions.

* * * * *